US011878772B2

(12) United States Patent
Johnston et al.

(10) Patent No.: US 11,878,772 B2
(45) **Date of Patent: *Jan. 23, 2024**

(54) OFFSHORE TRANSFER AND DESTRUCTION OF VOLATILE ORGANIC COMPOUNDS

(71) Applicant: G Squared V LLC, Katy, TX (US)

(72) Inventors: Gregory Scott Johnston, Katy, TX (US); Gary Brian Vogt, Kenner, LA (US)

(73) Assignee: G Squared V LLC, Katy, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/240,119

(22) Filed: Apr. 26, 2021

(65) Prior Publication Data

US 2021/0253200 A1 Aug. 19, 2021

Related U.S. Application Data

(63) Continuation of application No. 16/781,243, filed on Feb. 4, 2020, now Pat. No. 10,988,214.

(51) Int. Cl.
*B63B 25/08* (2006.01)
*B63B 27/24* (2006.01)
(Continued)

(52) U.S. Cl.
CPC ............ *B63B 25/082* (2013.01); *B63B 27/24* (2013.01); *B63B 27/28* (2013.01); *B63B 27/30* (2013.01);
(Continued)

(58) Field of Classification Search
CPC ....... B63B 25/00; B63B 25/082; B63B 27/00; B63B 27/24; B63B 27/28; B63B 27/30;
(Continued)

(56) References Cited

U.S. PATENT DOCUMENTS 4,036,576 A 7/1977 McCracken
4,233,922 A 11/1980 Conway
(Continued)

FOREIGN PATENT DOCUMENTS

WO WO 2011/065664 A2 3/2011

OTHER PUBLICATIONS

Timothy Sturtz et al. , "Final Report Ocean-Going Tanker Vessel Lightering Emissions in the Gulf of Mexico", Ramboll Environ, Novato, California, published Jun. 2017.
(Continued)

*Primary Examiner* — Lars A Olson
(74) *Attorney, Agent, or Firm* — Compton & Associates PLLC; Mattthew Compton

(57) ABSTRACT

A vapor taker system, a vessel-based solution to accommodate vapor destruction during hydrocarbon loading and/or lightering, is disclosed. The vapor taker has vapor destruction equipment, support fuel, and accommodation for loading hose connections as necessary to comply with air emissions requirements for the destruction of volatile organic compounds. The vapor taker system can be modular or fully integrated into a marine vessel such as a ship, barge, tanker, and so forth.

20 Claims, 8 Drawing Sheets

(51) Int. Cl.

| | |
|---|---|
| ***B63B 27/28*** | (2006.01) |
| ***B63B 27/30*** | (2006.01) |
| ***F17C 9/02*** | (2006.01) |
| *A62C 4/02* | (2006.01) |
| *B63B 35/28* | (2006.01) |

(52) U.S. Cl.
CPC .................. *F17C 9/02* (2013.01); *A62C 4/02* (2013.01); *B63B 35/28* (2013.01)

(58) Field of Classification Search
CPC ........... B63B 35/00; B63B 35/28; A62C 4/00; A62C 4/02
USPC ........................................................ 114/74 R
See application file for complete search history.

(56) References Cited

U.S. PATENT DOCUMENTS

| | | | | |
|---|---|---|---|---|
| 4,846,134 | A | 7/1989 | Perry et al. | |
| 5,050,603 | A | 9/1991 | Stokes et al. | |
| 5,054,526 | A | 10/1991 | Perkins | |
| 5,129,759 | A | 7/1992 | Bishop | |
| 5,315,832 | A | 5/1994 | Hopewell | |
| 5,377,723 | A | 1/1995 | Hilliard et al. | |
| 5,513,680 | A * | 5/1996 | Hilliard, Jr. | B01D 19/0005 141/82 |
| 6,015,451 | A | 1/2000 | Anderson et al. | |
| 6,467,271 | B2 | 10/2002 | Youn | |
| 6,923,225 | B2 | 8/2005 | Poldervaart et al. | |
| 6,994,506 | B2 * | 2/2006 | de Baan | B63B 27/24 414/139.4 |
| 7,032,390 | B2 | 4/2006 | Brodreskift | |
| 7,793,605 | B2 | 9/2010 | Poldervaart | |
| 8,186,170 | B2 * | 5/2012 | Boatman | B63B 27/34 114/230.12 |
| 8,308,517 | B1 | 11/2012 | Shivers, III et al. | |
| 8,375,878 | B1 | 2/2013 | Shivers, III et al. | |
| 8,490,563 | B1 | 7/2013 | Shivers, III et al. | |
| 8,561,634 | B2 | 10/2013 | Lee et al. | |
| 10,988,214 | B1 * | 4/2021 | Johnston | B63B 27/30 |
| 2004/0148963 | A1 | 8/2004 | Lothe | |
| 2006/0260193 | A1 | 11/2006 | Ryan et al. | |
| 2009/0199575 | A1 | 8/2009 | Faka | |
| 2010/0263389 | A1 | 10/2010 | Bryngelson et al. | |
| 2012/0240874 | A1 | 9/2012 | Yoo et al. | |
| 2014/0053770 | A1 | 2/2014 | Van Tassel | |

OTHER PUBLICATIONS

Committee on Control and Recovery of Hydrocarbon Vapors from Ships and Barges, "Commission on Engineering and Technical Systems, National Research Council, Controlling Hydrocarbon Emissions from Tank Vessel Loading", ISBN: 0-309-57132-4, National Academy Press, Washington, D.C., published 1987.

Methanol Institute, "Methanol Safe Handling and Safe Berthing", Technical Bulletin, published Dec. 2015.

Federal Register, vol. 78, No. 136, Part II, pp. 42596-42651, published Jul. 16, 2013 in USA.

DNV-GL, "Cargo Vapour recovery systems", DNVGL-CG-0042, published Nov. 2015.

JFE Engineering Corporation, "Tanker Vapor Recovery System", published approx. Mar. 2013 in Japan (available at http://www.jfe-eng.co.jp/en/foreign/pdf/tvr.pdf).

Federal Government, 33 CFR 154 Subpart P, published Jul. 2019 in USA.

MH Rahman, "Vapor Control System", published approx. Oct. 1, 2017 (available at https://www.slideshare.net/MHRAHMAN6/vapour-control-system).

* cited by examiner

OFFSHORE TRANSFER AND DESTRUCTION OF VOLATILE ORGANIC COMPOUNDS

CROSS REFERENCE TO RELATED APPLICATIONS

The present application claims priority to U.S. patent application Ser. No. 16/781,243 filed on Feb. 4, 2020.

FIELD OF THE INVENTION

The present invention generally relates to the transfer and destruction of volatile organic compound vapors in offshore operations.

BACKGROUND OF THE INVENTION

Since Congress lifted the United States' crude export ban in October of 2015, numerous companies are investigating ways to export domestic oil to foreign markets. Vessels utilized for crude export are often too large to be fully loaded at dockside facilities, requiring offshore lightering (e.g., half filling the tanker at the dock and performing an offshore ship to ship transfer for the remainder of the load). This method has proven inefficient and costly, so the market has responded with multiple applications for offshore oil export ports. These offshore port options include various forms of fixed and floating structures to assist in mooring and loading of large hydrocarbon transport vessels.

The loading and transfer of liquid hydrocarbons results in the creation of Volatile Organic Compounds (VOCs) which when released into the environment raises both safety and environmental concerns. VOCs are often highly flammable, and the buildup and/or ignition of their fumes can cause substantial harm to persons and property. VOCs also cause environmental harm when released into the atmosphere, onto land, or into a marine environment. As such, present marine terminal operations must be compliant with various state and federally mandated air emissions requirements. These requirements include capture or destruction of VOCs created during the process of loading liquid hydrocarbons.

Federal and state regulatory agencies also require an air permit prior to constructing a loading facility regardless of onshore or offshore application. Onshore permitting is governed by the Environmental Protection Agency (EPA) or the state's department of environmental quality (determined by volume and potential to emit), who, along with the United States Coast Guard (USCG), provides guidelines for vapor control requirements. Depending upon the distance from the shore, either state or federal law (and often both) governs air permitting requirements for a loading facility.

SUMMARY OF THE INVENTION

The loading and transfer of liquid hydrocarbons and other chemicals results in the creation of Volatile Organic Compounds (VOCs) which when released into the environment raises both safety and environmental concerns. In the context of offshore vessel-to-vessel (including ship-to-ship and buoy-to-ship) transfer of hydrocarbons and other chemicals, VOC mitigation is not adequately addressed by current technology such as reclamation, which is expensive, or venting, which is dangerous and causes environmental harms.

The present invention addresses the need of offshore VOC mitigation by providing, in some embodiments, a mobile (self-powered or towed) vessel (called a Vapor Taker) with a spread comprising a vapor destruction system. By connecting the Vapor Taker to a vessel being loaded with hydrocarbons or other chemicals, VOCs generated during that loading process may be transferred to the Vapor Taker for destruction. In some embodiments, a Vapor Taker spread may be incorporated into the vessel unloading or receiving hydrocarbons or other chemicals.

Generally speaking, this route of VOC mitigation results in less environmental harm and increased safety as compared to the alternative option of venting VOCs into the atmosphere or the marine environment. It is also generally less expensive than outfitting vessels with reclamation equipment.

DETAILED DESCRIPTION

The following definitions are helpful in understanding the invention. The word "vessel" means a floating structure being utilized in the process of hydro-carbon transfer. Vessel includes powered vessels (e.g., a boat, ship, tanker, etc.), non-powered vessels (e.g., a barge), and moored structures (e.g., a loading buoy, a catenary anchor leg mooring buoy, a floating storage system, etc.). The word "ship" means a self-propelled, floating, seagoing vessel ("vessel" being used in its plain and ordinary way and not as defined above) used as a means of transportation. For the avoidance of doubt, the term "ship" excludes floating structures permanently connected to the sea floor by anchoring, mooring, fixing, or in other ways.

The word "destruction" means a change in chemical structure due to interface with a heat source. It includes, but is not limited to: incineration, flaring, combustion, heating, and introduction of flame (whether open to atmosphere or enclosed). The word "fuel" means an accelerant or substance which provides an increased British Thermal Unit (BTU) level to a hydrocarbon vapor stream (e.g., propane, natural gas, hydrogen, etc.). The word "spread" means the marine context of the word, in particular the specialized equipment onboard a vessel that is used for the tasks the vessel will perform. A vessel with a spread for the transfer and destruction of VOCs, particularly hydrocarbons, is referred to herein as a Vapor Taker (VT).

The present invention is described with reference to the attached figures. The figures are not drawn to scale. Several aspects of embodiments of the invention are described below with reference to example applications for illustration. It should be understood that numerous specific details, relationships, and methods are set forth to provide an understanding of the invention. One skilled in the relevant art, however, will readily recognize that the invention can be practiced without one or more of the specific details or with other methods.

In other instances, well-known structures or operations are not shown in detail to avoid obscuring various aspects of different embodiments of the invention. The present invention is not limited by the illustrated ordering of acts or events, as some acts may occur in different orders and/or concurrently with other acts or events. Furthermore, not all illustrated acts or events are required to implement a methodology or system in accordance with the present invention.

Figure 1A:
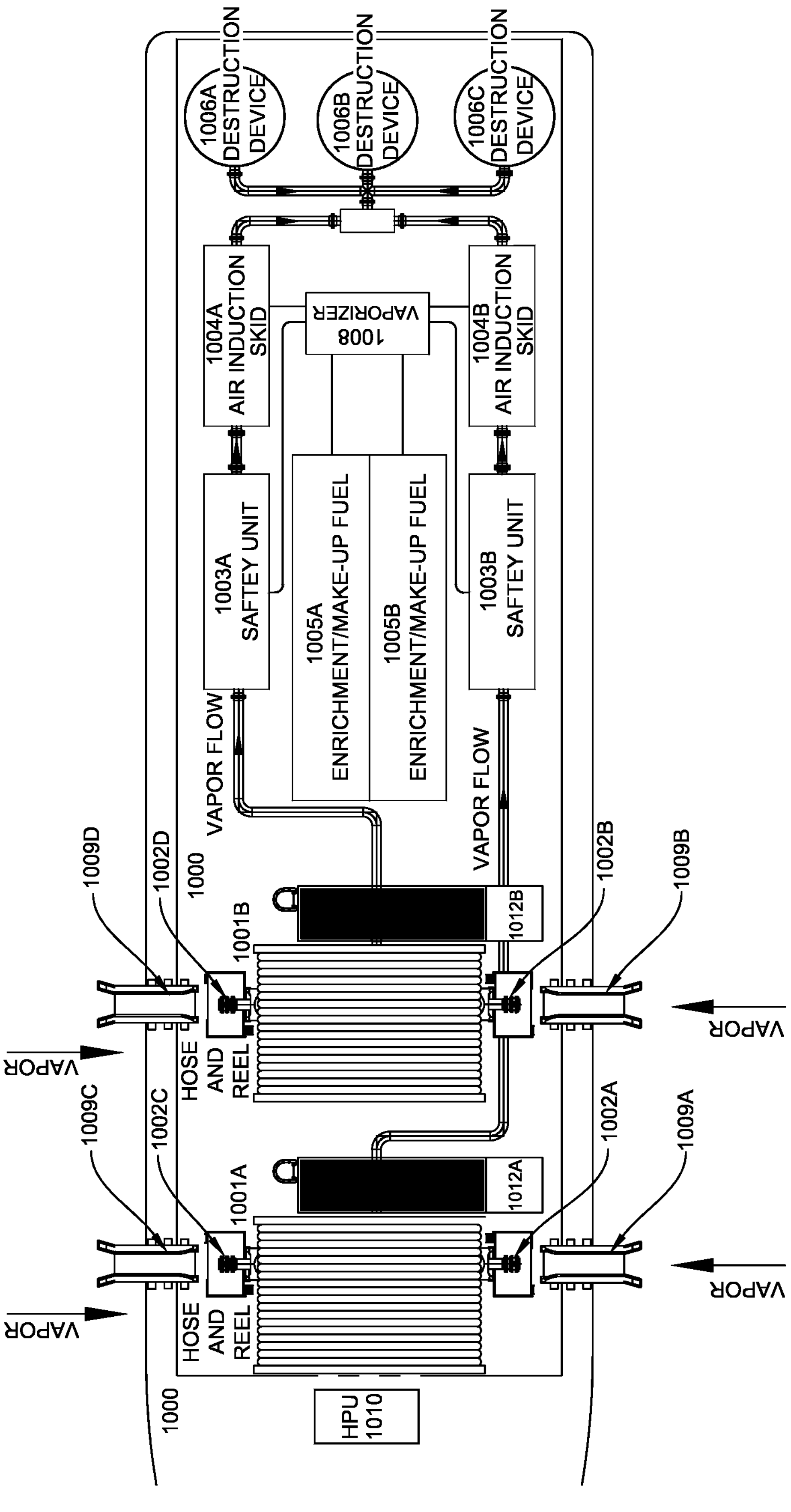
FIG. 1A depicts an embodiment of a Vapor Taker spread that utilizes a hose deployment and retraction system.
Figure 1B:
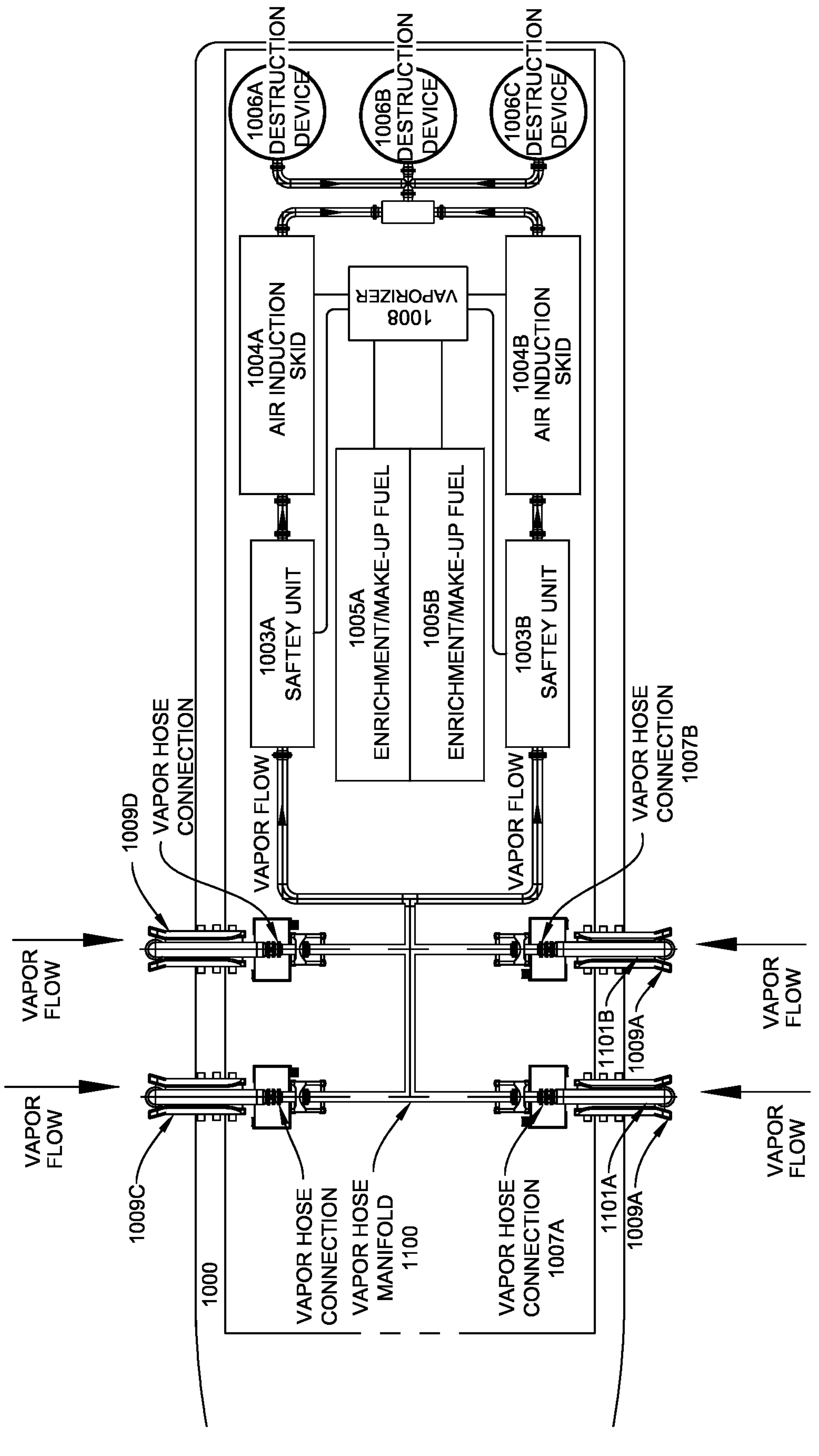
FIG. 1B depicts another embodiment of a Vapor Taker spread.

FIGS. 1A and 1B are depictions of various Vapor Taker spreads. A VT spread is usually sized by the specific application (in particular, the loading rate, and/or the characteristics of the product(s) being loaded). FIG. 1A depicts an VT 1000 embodiment wherein the vapor hoses 1002A-B and deployment system (reels 1001A-B, chutes 1009A-D and hydraulic power unit (HPU) 1010 are integrated into the spread on a vessel. The hoses in FIG. 1A may be deployed either port or starboard or both (e.g., 1002A starboard and 1002B port). Items 1002C and 1002D show the hoses 1002A and 1002B respectively as if deployed starboard side. Alternative configurations allow for hose deployment off the bow or stern of the ship. The hoses 1002A-B may be floating hoses or non-floating hoses.

Reel 1001A deploys and retracts the vapor hose 1002A through deployment chutes 1009A or 1009C located on the port and starboard sides of the ship respectively. Additional deployment chutes may also be located at the bow and/or stern of the ship. Likewise reel 1001B deploys vapor hose 1002B through deployment chutes 1009B or 1009D. In some instances, deployment chutes are not needed depending on the arrangement of the ship deck and sides. The deployment chutes 1009A-D as shown have a curved protrusion from the side of the ship that allow a hose to easily be deployed and retracted. In some cases, the chute may be curved (sloping downwards towards the water) and/or belled (at one or both of the chute ends) so as to support the hose and avoid and/or minimize pinching and/or compression of the hose, but in other cases, curved and/or belled chutes are not needed. Further, the chutes may also be belled on the reel side to assist with the hose to reel spooling operation. Alternatively, the chutes 1009A-D may simply be holes in a side of the VT 1000 or indentations along the top of a side. A hydraulic power unit (HPU) 1010 provides hydraulic power to rotate the reels 1001A and 1001B. Alternatively, individual hydraulic power units may be used for each reel.

In FIG. 1A, the reels 1001A-B are shown in an "on-deck" configuration but may also be located below deck. The reels 1001A-B rotate on an axis parallel to the length of the ship. Alternatively, they may also be mounted so as to rotate on an axis perpendicular to the length of the ship, or neither parallel nor perpendicular to the length of the ship. Control stations 1012A and 1012B have a housing and control systems which allow an operator to control the deployment and retraction of a hose. Control station 1012A controls reel 1001A and retraction and deployment of hose 1002A. Likewise, control station 1012B controls reel 1001B and retraction and deployment of hose 1002B. While FIG. 1A shows two control stations, a single control station or several additional control stations may also be utilized. Generally, a single control station controls a single reel, but in some configurations, a single control station may control multiple reels. In some circumstances, a reel may not be necessary, particularly if there is sufficient space on or below deck to store the hose without a reel, or in cases where the hose may be left in the water when not in use.

FIG. 1B depicts a VT spread configuration suitable for larger hoses 1101A-B, particularly where the hoses are stored on site, for example, when the hoses are stored by connecting them to a Catenary Anchor Leg Mooring (CALM) buoy and allowing them to weathervane or otherwise float in the water. Alternatively, the hoses may be stored on the deck of the VT, below the deck, towed in the water, and so forth. In FIG. 1B, the hoses 1101A-B (as well the hoses in other figures) may be floating hoses, non-floating hoses, conventional rubber hoses (which may or may not float), flexible pipe (which may or may not float), or a combination thereof. They generally range in size from 6 to 36 inches in diameter. They may be provided in continuous lengths or joinable segments. They are typically equipped with flanges and/or end fittings in accordance with safety and environmental requirements. Hoses with exposed ends that are open to the environment are usually fitted with valves or flappers which stop the ingress of water into the hoses.

When stored in the water, these hoses 1101A-B are recovered from the water and connected to the VT spread through a vapor hose manifold. As with FIG. 1A, chutes may also be present, and may aid in supporting a hose during hose recovery, vapor transfer, and/or subsequent disengagement or release of the hose so as to minimize and/or avoid pinching and compression of the hose. The vapor hose manifold 1100 allows connection from both port and starboard directions; however, the vapor hose manifold 1100 may also be configured for bow and/or stern hose retrieval and connection. FIGS. 1A and 1B illustrate a two-hose scenario; however, a single hose or multiple hoses may be utilized based on the specific application. Regardless of the hose deployment/connection system, hydrocarbon vapor (resulting from liquid hydrocarbon loading) flow in the hoses is, in the general case, towards the VT.

With respect to FIG. 1A, vapors flow through the hoses 1002A-B and then through piping (or hoses) to the Safety Units 1003A-B. Likewise, in FIG. 1B, vapors pass through hoses 1101A-B to the Vapor Hose Manifold 1100 and then then through piping (or hoses) to the Safety Units 1003A and 1003B. The Safety Units (SU) 1003A and 1003B include the necessary safety equipment such as vacuum vents, detonation arrestors, oxygen analyzers, and fuel enrichment ports to ensure safe vapor flow (particularly so that the oxygen content is outside of the spontaneous combustion range). An enrichment system is integrated into the Safety Units 1003A and 1003B. The enrichment system provides enrichment fuel to enrich the vapors to keep them in a non-explosive state prior to combustion if the vapors are not inerted. If the vapors have already been inerted, adding enrichment fuel is typically not necessary. The vapor flow continues to the Air Induction Skids 1004A and 1004B (sometimes referred to as blower skids). The Air Induction Skids 1004A and 1004B have vapor-liquid separators (usually a knock-out pot) to reduce liquid content of the vapor, air inducement device(s) (typically a blower, multiphase pump, or compressor), pressure and temperature sensors, and flame or detonation arrestors. (A blower will typically have either integrated or separate variable frequency drive to ensure consistent flow.) The vapor continues onward to the destruction devices. One typical path for the hydrocarbon vapor as it passes through a Safety Unit and an Air Induction Skid may include (without limitation) passing through a fire safe vapor control valve, then a detonation arrestor, then a vapor-liquid separator, and then to the vapor destruction device for destruction.

FIGS. 1A & 1B depict enclosed combustors 1006A, 1006B, and 1006C, but these devices could be open flares, incinerators, or other devices whereby heat is introduced to the vapor stream, for purposes of destroying the vapor. While FIGS. 1A & 1B shows three destruction devices (combustors) being used, one, two, four, or more devices may be used dependent upon the specific application. The enclosed combustors 1006A, 1006B, and 1006C are typically comprised of metallic stacks with internal insulation, outfitted with antiflashback burners, vapor nozzles, and air control systems. The enclosed combustors 1006A, 1006B, and 1006C are typically preheated with a supporting fuel, then vapor is added when an appropriate temperature is reached. The supporting fuel may also be used as an enriching fuel. This helps to ensure that the combustion happens as efficiently as possible.

The Vapor Taker spread in FIGS. 1A & 1B incorporates fuel storage 1005A and 1005B for purposes of enrichment and make-up fuel (sometimes referred to as assist gas, this is typically in the form of natural gas or, in the preferred embodiment, propane). If propane is utilized (and/or if the utilization rate requires it) a vaporizer 1008 may be incorporated into the spread. Fuel may be routed to the Safety Units 1003A and 1003B to provide enrichment. Fuel may also be routed to the Air Induction Skids 1004A and 1004B and/or to the combustion devices 1006A, 1006B, and 1006C for assist fuel purposes. The fuel storage 1005A and 1005B may also provide fuel to the destruction devices (enclosed combustors) 1006A, 1006B, and/or 1006C piolets. The fuel serves as enrichment as well as make-up fuel for pre-heat and temperature maintenance purposes. While FIGS. 1A & 1B show two fuel storage tanks 1003A and 1003B, single, dual, or multiple tanks may be used based upon the specific application. Hydrocarbons captured by a vapor-liquid separator (e.g., a knock-out pot) in the process (such as from condensation of vapors, or liquid hydrocarbons that accidentally enter the system as a liquid) may be (but need not be) manually or automatically drained into a collection tank. Alternatively, a hydrocarbon (or other chemical) reclamation process and equipment may be incorporated into the processes described above.

Figure 2A:
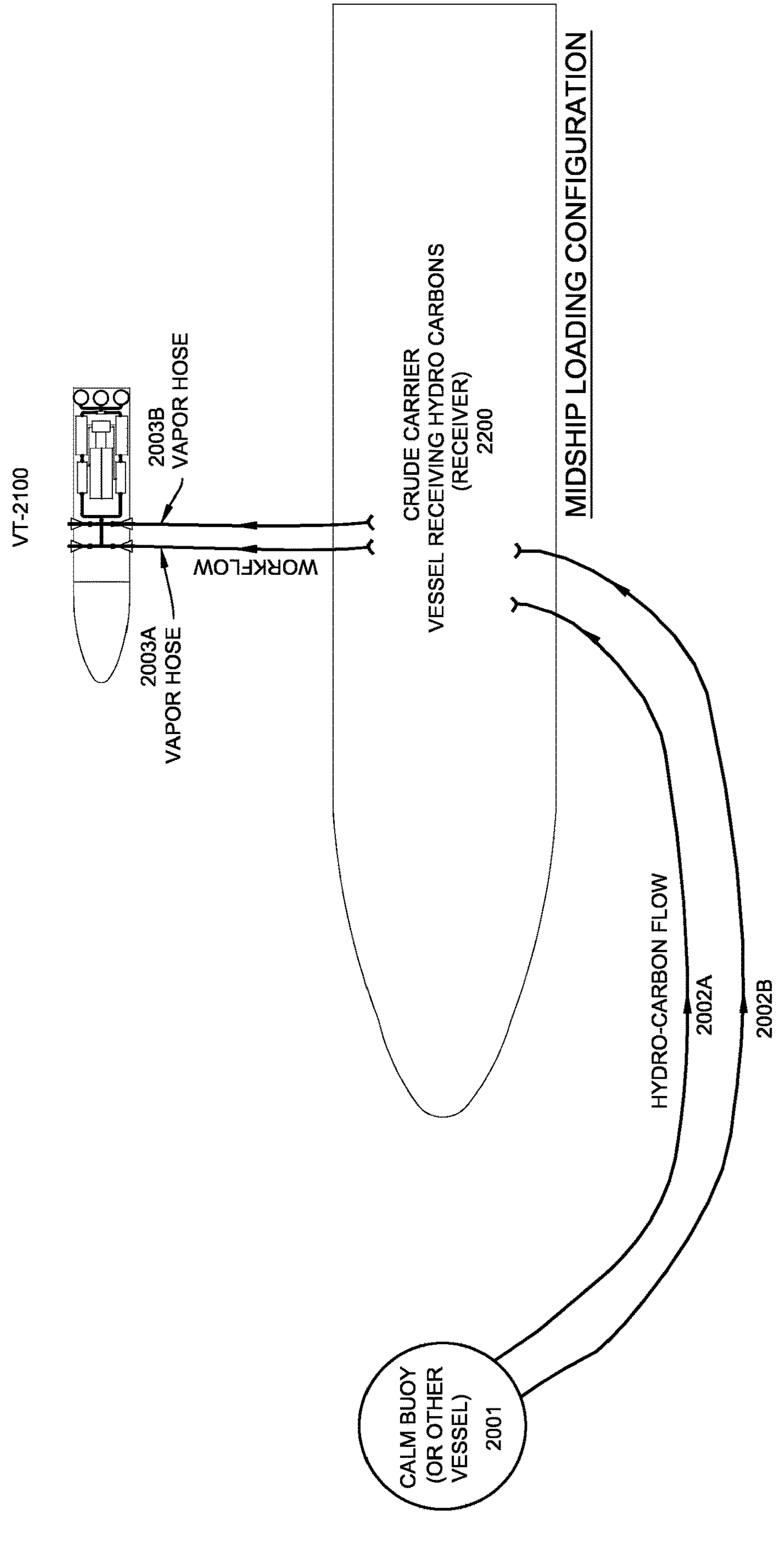
FIG. 2A depicts a midship loading configuration where a tanker receives hydrocarbons from a CALM bouy.
Figure 2B:
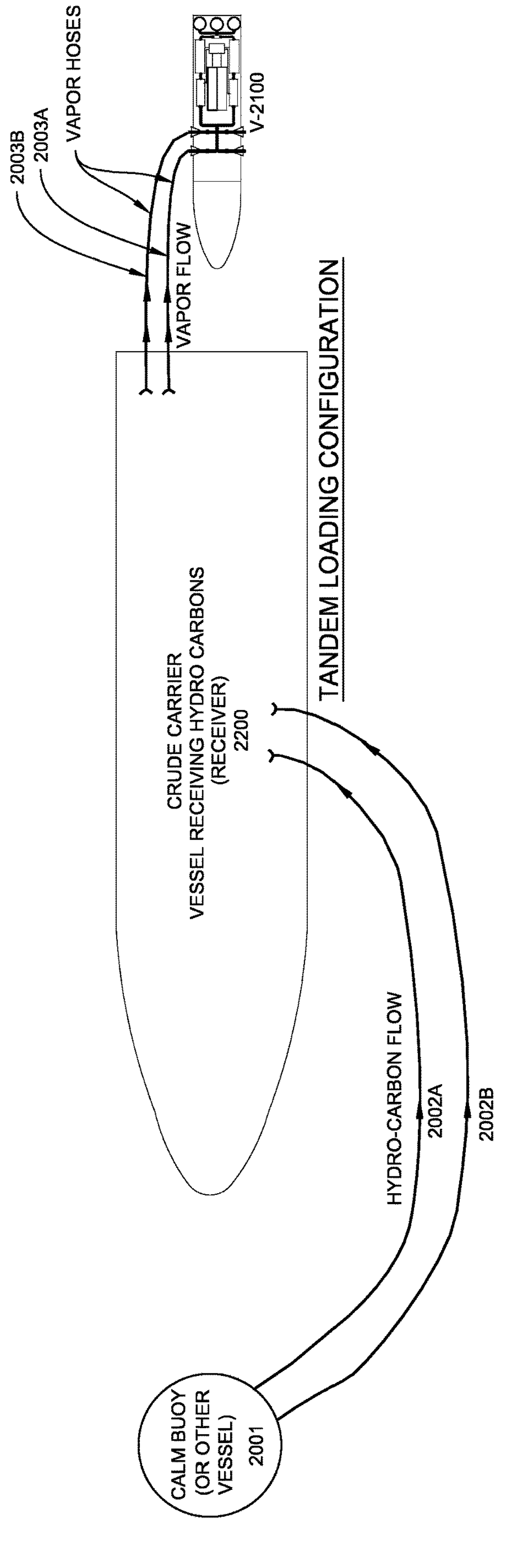
FIG. 2B depicts a tandem loading configuration where a tanker receives hydrocarbons from a CALM bouy.

FIGS. 2A & 2B depict different utilization scenarios for a Vapor Taker 2100 ship or vessel. FIG. 2A is a depiction of a VT 2100 being utilized in an offshore buoy loading operation. FIG. 2A depicts a midship loading configuration. A VT 2100 has approached a tanker 2200 on the tanker's 2200 starboard side. As with all tankers, the tanker 2200 has one or more storage holds (or tanks) for carrying liquids (e.g., oil, petroleum, petroleum products, crude oil, fuels, chemicals, fertilizers, and so forth) that may be loaded and unloaded. In most cases, the storage holds are also independent from the tanker's own fuel supply (e.g., the diesel or fuel oil used to power the tanker's 2200 engine(s)). In these examples, the tanker 2200 is for transporting various types of crude oil. The VT 2100 is facing in generally the same direction as the tanker 2200. The VT 2100 has connected hoses 2003A and 2003B through its port side deployment chutes (e.g., items 1009A and 1009B in FIG. 1A). The hoses 2003A and 2003B have been connected to vapor hose connections (e.g., items 1007A and 1007B on the vapor hose manifold 1100 in FIG. 1B) on the VT 2100. As noted above, the hoses 2003A and 2003B may be stored by connecting them to a Catenary Anchor Leg Mooring (CALM) buoy and allowing them to weathervane in the water. Alternatively, the hoses 2003A and 2003B may be stored by the VT 2100 (via reel, on deck, underneath the deck, towed, and so forth), or stored by the tanker (2200, 2300) being loaded. Alternatively, they may be stored by a third vessel or buoy that aids in the loading process. The hoses 2003A and 2003B may be floating hoses or non-floating hoses.

While FIG. 2A shows two hoses being used, a single hose, three hoses, or several additional hoses may be used. The tanker 2200 is being loaded with hydrocarbons from a CALM buoy 2001. CALM buoys are a type of single point mooring, typically with a turn table positioned above the geostationary hull mounted on a roller bearing. Undersea pipelines may connect the CALM buoy to a boosting station (onshore or offshore) with associated storage. Hoses 2002A and 2002B are generally used to connect the buoy to a ship such as a tanker 2200 for the transfer of hydrocarbons. As hydrocarbons are loaded from the buoy 2001 (or another vessel) to the tanker 2200, vapors generated by the hydrocarbons being loaded into the tanker's 2200 tanks are transferred from the tanker 2200 through the vapor hoses 2003A and 2003B to the VT 2100. Tanker 2200 may be a wide variety of vessels, including Ultra Large Crude Carriers (ULCC), Very Large Crude Carriers (VLCC), Aframax, Panamax, Suezmax, shuttle tankers, barges, and slot barges. Furthermore, instead of a CALM buoy 2001, a Floating Production Storage Offloading facility (FPSO) or a Floating Storage Offloading facility (FSO) may be utilized. In an alternative embodiment, the VT 2100 may use chutes located at or near the bow or stern of the VT 2100 while still being parallel to the tanker 2200. In another alternative embodiment, the VT 2100 may face a direction perpendicular, or otherwise generally not parallel to the tanker 2200.

With respect to FIG. 2A, the process of connecting vapor hoses 2003A and 2003B to the VT 2100 is further described with respect to on-site hose storage. The VT 2100 comes alongside the CALM bouy, and disconnects the end(s) (e.g., the end of the hose(s) for connection to the VT 2100) of the hoses 2003A and 2003B. The VT 2100 recovers the hose end onto the VT through a chute (e.g., FIG. 1B, 1001A, 1001B, 1002A, 1002B) in order to avoid overbending or pinching the hose. Once recovered onto the VT 2100 the hose will be secured, and connected to the vapor manifold (e.g., FIG. 1B, 1100) on the VT 2100.

In a preferred scenario, a separate vessel (not shown) is used to carry the receiving vessel's (tanker 2200) end of vapor hose to the receiving vessel's messenger line (or the messenger line to the end of the vapor hose), where the messenger line (sometimes called a pull-in line) is connected to the vapor hose. Once connected, the receiving vessel pulls in the vapor hose. Once pulled in, the hose is secured and connected to the receiving vessel's vapor connection. The procedure is repeated (serially or in parallel) for as many vapor lines as required. Once vapor line(s) have been secured, the VT 2100 will position itself with the appropriate vessel separation. Vapor transfer will then begin. In some scenarios, the VT 2100 is used in place of the separate vessel (not shown) to carry the receiving vessel's messenger line(s) to the vapor hose(s) (or the vapor hose(s) to the messenger line(s)).

When vapor transfer is complete, the receiving vessel's end of hose is disconnected first and lowered (or dropped) to the water. This may be done with a hook arrangement which allows for "hands free" disconnection. Alternatively, the VT 2100 or a separate vessel can perform the disconnection. Once the receiving vessel's end of the hose is disconnected, the VT 2100 transits to the CALM buoy. Once near the CALM buoy, the vapor hose is disconnected from the VT's vapor manifold, transferred to the CALM buoy, and secured. Alternatively, the vapor hose may be disconnected from the vapor manifold (FIG. 1B, 1100), and transferred to a separate vessel. This vessel transits to the CALM buoy, transfers the vapor hose to the CALM buoy, and secures it. This process may be repeated (serially or in parallel) until all hoses have been transferred to the CALM buoy.

In cases where the hoses are integrated into, stored by, or reeled on a vapor taker vessel, the VT comes along side (or near) the receiving vessel and recovers a messenger line from the receiving vessel (tanker 2200). The messenger line is attached to the receiving end of the hose, and the receiving vessel pulls in the vapor hose. Once the hose is pulled in, it is secured and connected to the receiving vessel's vapor connection. The procedure is repeated for as many vapor lines as required (serially or in parallel). Once vapor line(s) have been secured, the VT will extend (or in some cases recover) hose until the appropriate vessel separation is achieved. Alternatively, a separate vessel (not shown) may be used to pull a vapor hose from the VT to a messenger line, where the connection between the hose and the line may be made.

When vapor transfer is complete, the receiving vessel's end of hose is disconnected first and lowered (or dropped) to the water. This may be done with a hook arrangement which allows for "hands free" disconnection. Alternatively, the VT or a separate vessel can perform the disconnection. Once a hose is disconnected, it may be recovered (e.g., reeled in case of a reel, or otherwise pulled in) by the VT, and secured on, in, or to the VT. Alternatively, it may be transferred and/or connected in a towing position, or pulled from the retrieving vessel to the VT or a separate vessel without interfacing with the water.

FIG. 2B depicts the vapor taker system VT 2100 being utilized in an offshore buoy loading operation. Here, the VT 2100 is in a tandem loading configuration instead of a midship configuration. The VT 2100 has approached tanker 2300 from the tanker's 2300 stern direction, has connected hoses 2003A and 2003B, and proceeds in generally the same manner of vapor receipt and destructions as described in relation to FIG. 2A. In an alternative embodiment, the VT 2100 may use chutes located at or near the bow or stern of the VT 2100 to avoid hose pinching while still being parallel to the tanker 2300. In another alternative embodiment, the VT 2100 may face a direction perpendicular, or otherwise generally not parallel to the tanker 2200. While FIGS. 2A & 2B show a VT 2100 without reels as in FIG. 1B, a VT with reels or a VT with other application specific configurations may be used.

Figure 3A:
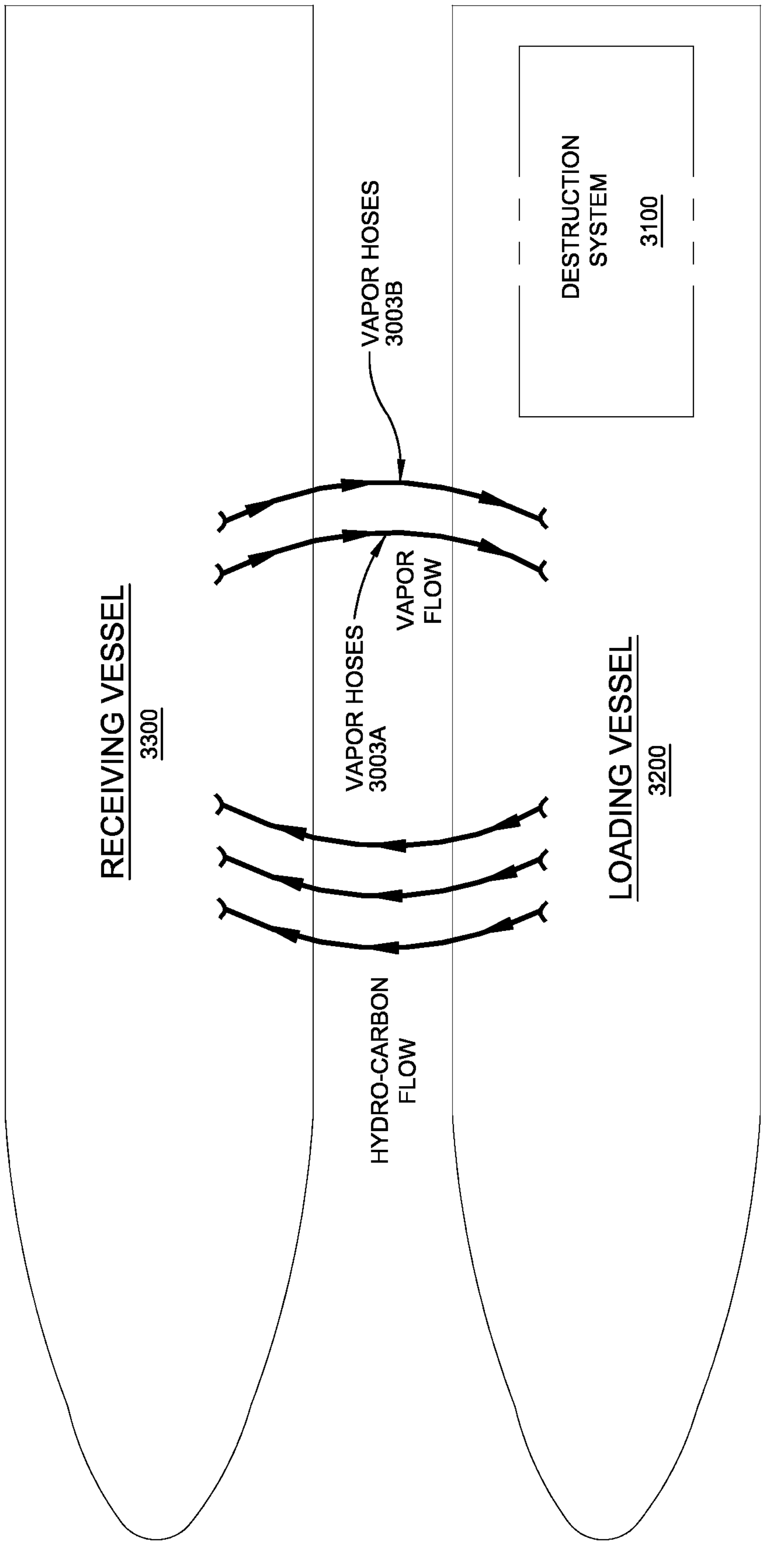
FIG. 3A depicts a two-vessel lightering scenario where a Vapor Taker spread is located on the loading vessel.
Figure 3B:
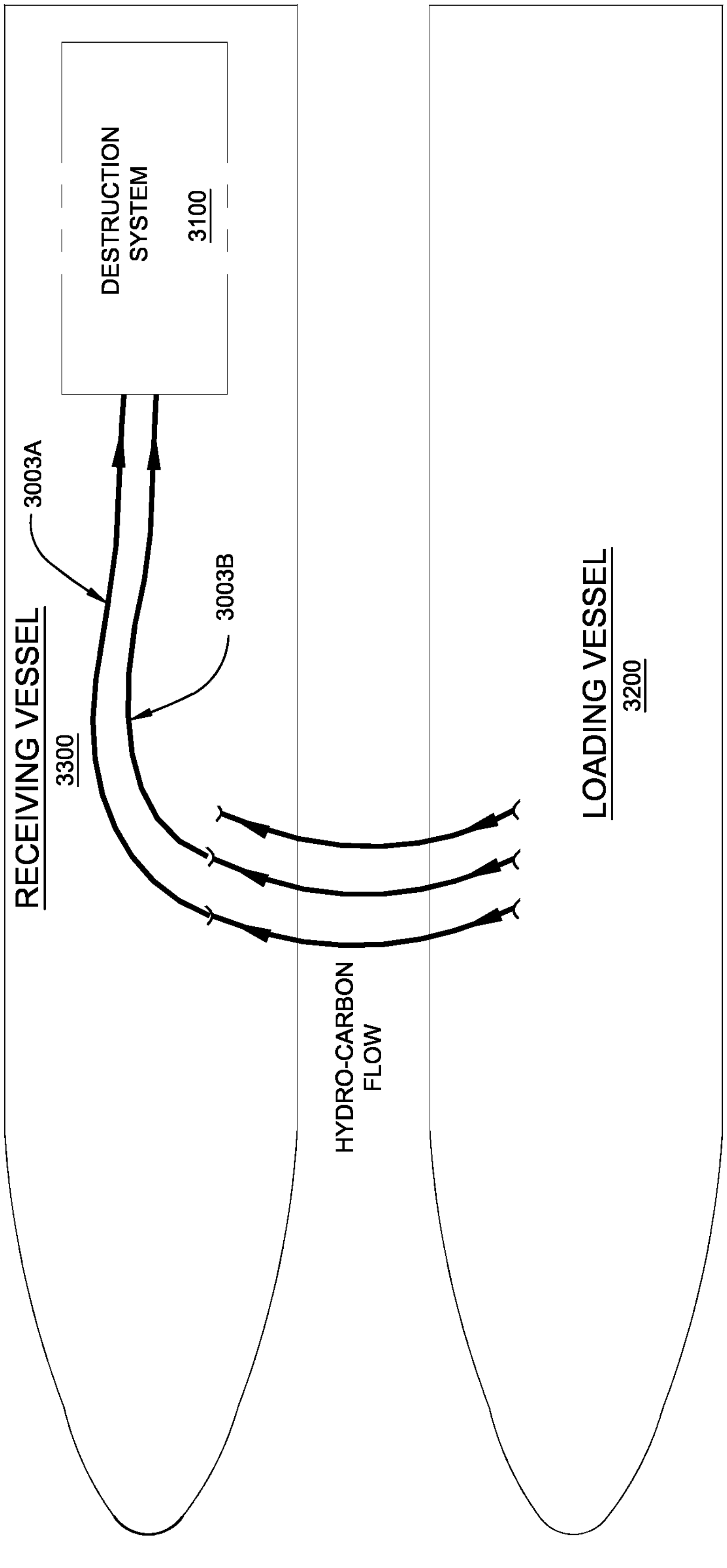
FIG. 3B depicts a two-vessel lightering scenario where a Vapor Taker spread is located on the receiving vessel.

FIGS. 3A and 3B depicts two different scenarios whereby the hydrocarbons are being transferred from vessel-to-vessel, a process known as "Lightering." In this process, a loading vessel 3200 (often referred to as a shuttle tanker), transports crude to be loaded onto a receiving transport vessel 3300. This process can be used to bring small loads to a larger ship for international transport, or the reverse whereby the smaller vessel is unloading a larger vessel for local transport.

FIG. 3A depicts a Vapor Taker spread 3100 is integrated onto the loading vessel 3200. The vapor hoses 3003A and 3003B are connected between the two vessels 3200 and 3300. In FIG. 3A, the hoses 3003A-B may be stored by the receiving vessel 3300 (or the loading vessel 3200) via reel, on deck, underneath the deck, towed, and so forth. Alternatively, they may be stored by a third vessel or buoy that aids in the lightering process. The hoses 3003A-B may be floating hoses or non-floating hoses.

With respect to FIG. 3A, the process of connecting vapor hoses 3003A and 3003B between the vessels 3200 and 3300 is further described. In a typical scenario, the vessel with the vapor hose(s) (the carrying vessel) connects (or has already connected) it's end(s) of the vapor hose(s) to the carrying vessel. The carrying vessel then obtains and connects a messenger line from the other vessel (the retrieving vessel) to the hose. The retrieving vessel then retrieves the hose using the messenger line. The hose is then connected to the retrieving vessel's vapor hose connection. Vapor transfer may then begin. Alternatively, a third vessel may be used to connect the messenger line to the hose.

When vapor transfer is complete, the retrieving vessel's end of hose is disconnected first and lowered (or dropped) to the water. This may be done with a hook arrangement which allows for "hands free" disconnection. Alternatively, the carrying vessel or a separate vessel may perform the disconnection. Once a hose is disconnected, it may be recovered (e.g., reeled in case of a reel, or otherwise pulled in) by the carrying vessel, and secured on, in, or to the carrying vessel. Alternatively, it may be transferred and/or connected in a towing position, or pulled from the retrieving vessel to the carrying vessel without interfacing with the water.

FIG. 3B depicts a Vapor Taker spread that is integrated onto the receiving vessel 3300. The vapor hoses 3003A and 3003B on the same vessel which is being loaded 3300. Alternatively, vapors hoses 3003A and 3003B could be permanently piped (often called "hard piped") on the vessel. With respect to FIGS. 3A and 3B, vapor processing through the destruction system 3100 is generally the same as described with respect to FIGS. 1A and 1B. Loading vessel 3200 and receiving vessel 3300 each may be a wide variety of vessels, including Ultra Large Crude Carriers (ULCC), Very Large Crude Carriers (VLCC), Aframax, Panamax, Suezmax, shuttle tankers, barges, and slot barges.

Figure 3C:
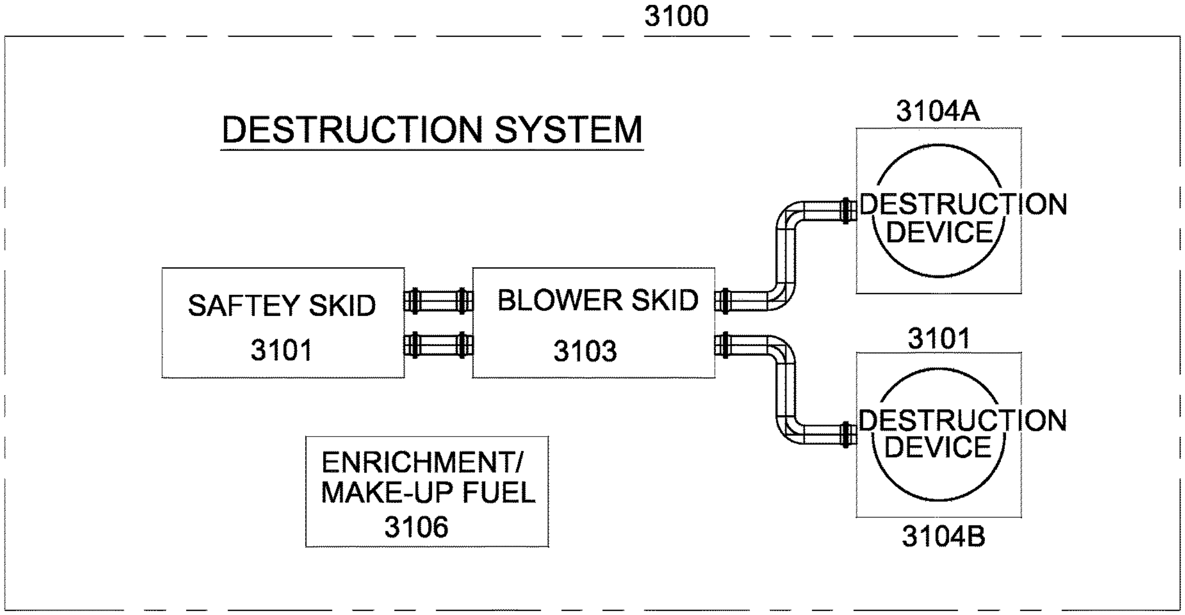
FIG. 3C depicts a variation of a Vapor Taker spread for tankers.

FIG. 3C depicts a variation of a Vapor Taker spread 3100 for tankers. Vapor hoses (or alternatively piping) connect to a Safety Skid 3101 such that vapors created during the loading process flow from the hoses (or piping) to the Safety Skid 3101, then flow to the Blower Skid 3103, and then to the destruction devices 3105A-B. The Safety Skid (as with the Safety Units (SU) 3101 and 1003B) includes the necessary safety equipment such as vacuum vents, detonation arrestors, oxygen analyzers, and fuel enrichment ports to ensure safe vapor flow (particularly so that the oxygen content is outside of the spontaneous combustion range). An enrichment system similar to the one shown in FIGS. 1A and 1B is integrated into the Safety Skid 3101. The Blower Skid 3103 (as with the Air Induction Skids 1004A and 1004B in FIGS. 1A and 1B) have vapor-liquid separators (usually a knock-out pot) to reduce liquid content of the vapor, air inducement device(s) (typically a blower, multiphase pump, or compressor), pressure and temperature sensors, and flame or detonation arrestors. The vapor continues onward to the destruction devices 3104A-B where the vapor is destroyed. Enrichment or makeup fuel storage 3106 may also be needed in some applications. While FIG. 3C depicts a modified version of the Vapor Taker spread in FIGS. 1A-B, either spread may be used, and both may be further adapted based on the specific application.

Figure 4:
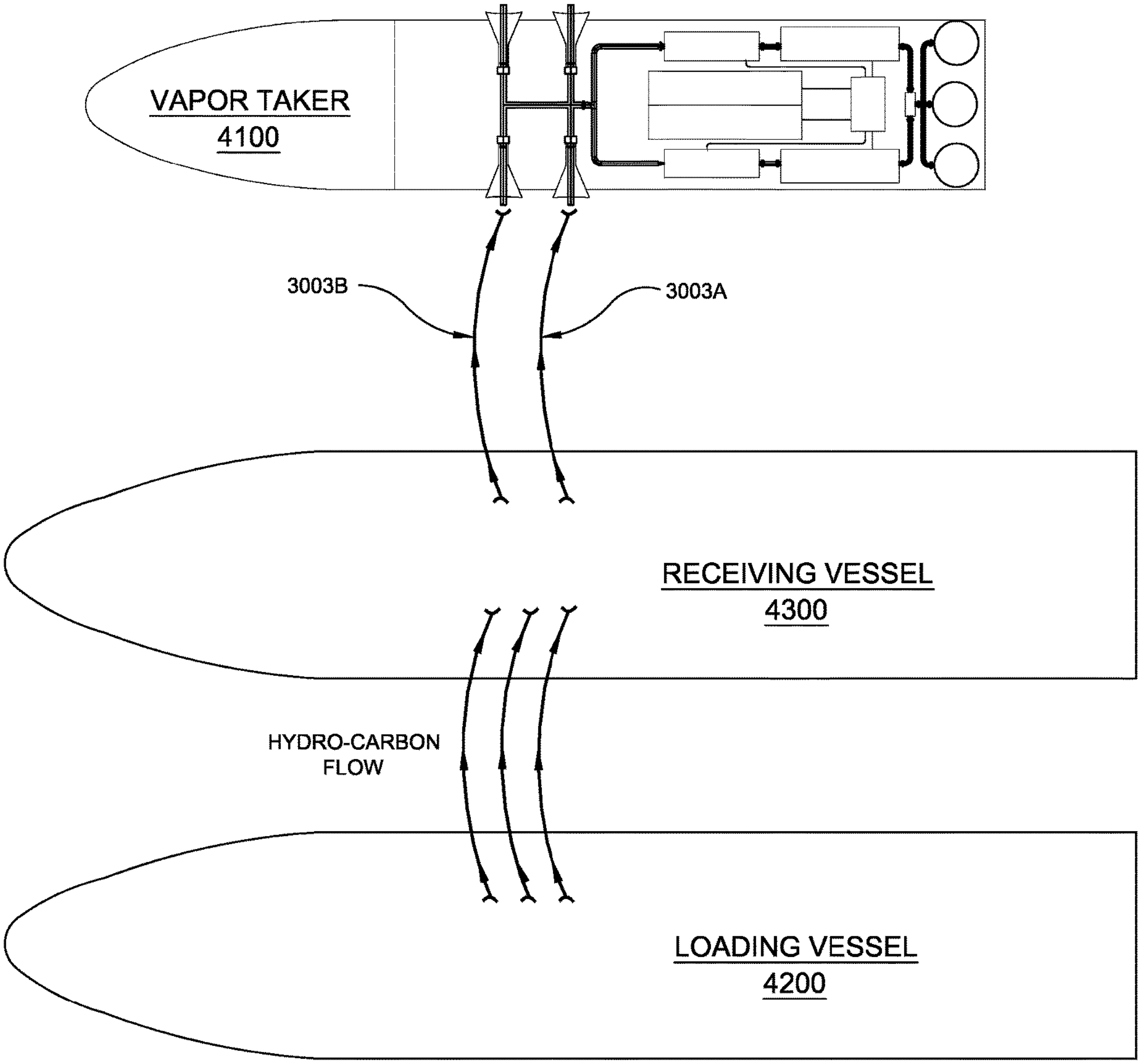
FIG. 4 depicts a three-vessel lightering scenario.

In FIG. 4, a three-vessel or three-ship Lightering configuration is shown. A loading vessel 4200 is offloading hydrocarbons to a receiving vessel 4300. In that process, hydrocarbon vapors are generated on the receiving vessel 4300. Hydrocarbon vapors from the receiving vessel 4300 are transferred from the receiving vessel 4300 to the VT 4100 through hose(s) 4003A and 4003B. In FIG. 4, the hoses 4003A-B may be stored by the receiving vessel 4300, the loading vessel 4200, or the VT 4100 via reel, on deck, underneath the deck, towed, and so forth. Alternatively, they may be stored by a fourth vessel or buoy. The hoses 4003A-B may be floating hoses or non-floating hoses.

With respect to FIG. 4, the process of connecting vapor hoses 4003A and 4003B to the VT 4100 is further described. The VT 4100 comes alongside (or near) the receiving vessel 4300. The VT 4100 connects (or has already connected) it's end(s) of the vapor hose(s) to the VT 4100 to the vapor manifold (e.g., FIG. 1B, 1100) on the VT 4100. In many circumstances, this is done through a chute (e.g., FIG. 1B, 1009A) in order to avoid overbending or pinching the hose. In cases where the hoses are stored at or near a buoy, the retrieval process is essentially the same as described with respect to FIGS. 2A-B.

In some scenarios, a separate vessel (not shown) is used to carry the end of vapor hose to the receiving vessel's 4300 messenger line (or the messenger line to the end of the vapor hose), where the messenger line is connected to the vapor hose. Once connected, the receiving vessel 4300 pulls in the vapor hose. Once pulled in, the hose is secured and connected to the receiving vessel's vapor connection. The procedure is repeated (serially or in parallel) for as many vapor lines as required. Once vapor line(s) have been secured, the VT 4100 will position itself with the appropriate vessel separation. Vapor transfer will then begin. In some scenarios, the VT 4100 is used in place of the separate vessel (not shown) to carry the receiving vessel's messenger line(s) to the vapor hose(s) (or the vapor hose(s) to the messenger line(s)).

In cases where the hoses are integrated into, stored by, or reeled on a vapor taker vessel, the VT comes along side (or near) the receiving vessel 4300 and recovers a messenger line from the receiving vessel 4300. The messenger line is attached to the receiving end of the hose, and the receiving vessel pulls in the vapor hose. Once the hose is pulled in, it is secured and connected to the receiving vessel's vapor connection. The procedure is repeated for as many vapor lines as required (serially or in parallel). Once vapor line(s) have been secured, the VT will extend (or in some cases recover) hose until the appropriate vessel separation is achieved.

Once the hydrocarbon vapors have reached the VT 4100, they are then processed and destroyed as shown with respect to FIGS. 1A-B. While FIG. 4 shows the VT 4100 in a midship configuration with the receiving vessel 4300 in a three-vessel embodiment, the VT 4100 may also use a tandem configuration, or the various alternative configurations discussed with respect to FIGS. 2A-B, or some other configuration. Loading vessel 4200 and receiving vessel 4300 each may be a wide variety of vessels, including Ultra Large Crude Carriers (ULCC), Very Large Crude Carriers (VLCC), Aframax, Panamax, Suezmax, shuttle tankers, barges, and slot barges.

Typically, loading scenarios (such as those noted above with respect to FIGS. 2-4) where the loading rates are between 3,000 barrels per hour (BPH) and 200,000 BPH (inclusive) may likely benefit the most from the present invention. Generally, given a fixed amount of hydrocarbons to transfer, the amount of hydrocarbon vapors generated increase with the loading rate. The faster the loading rate, the more hydrocarbon vapors are generated, and the more critical it is to safely handle the resulting vapors.

When vapor transfer is complete, the receiving vessel's end of hose is disconnected first and lowered (or dropped) to the water. This may be done with a hook arrangement which allows for "hands free" disconnection. Alternatively, the VT 4100 or a separate vessel can perform the disconnection. Once a hose is disconnected, it may be recovered (e.g., reeled in case of a reel, or otherwise pulled in) by the VT, and secured on, in, or to the VT. Alternatively, it may be transferred and/or connected in a towing position, or pulled from the retrieving vessel to the VT or a separate vessel without interfacing with the water.

While various embodiments of the present invention have been described above, it should be understood that they have been presented by way of example only, and not of limitation. In particular, the type of volatile organic compounds or hydrocarbons described in the examples are not meant to be limiting. The present invention is equally applicable to combustible vapors generated with respect to hydrocarbon transfer as well as non-hydrocarbon derived transfer creating chemical vapors that can be destroyed. Likewise, the various diagrams depict exemplary configurations for certain embodiments of the invention, which is done to aid in understanding the features and functionality that can be included in the invention.

The invention is not restricted to the illustrated examples or configurations, but the desired features can be implemented using a variety of alternative architectures and configurations. Indeed, it will be apparent to one skilled in the art how alternative functional, logical, or physical partitioning and configurations can be implemented to implement (or discard) various features of the present invention. Thus, the breadth and scope of the present invention as claimed should not be limited by any of the above described exemplary embodiments.

What is claimed is:

1. A spread on a first vessel comprising:
- a hose for the transfer of hydrocarbon vapors generated during the loading of a second vessel from the second vessel to the first vessel;
- a fire safe vapor flow control valve;
- a detonation arrestor; and
- a vapor blower, wherein during operation of the spread on the first vessel, the hydrocarbon vapors transferred to the first vessel may pass through the hose, then the fire safe vapor control valve, and then the detonation arrestor.

2. A method comprising:
- transferring through a hose, from a first vessel to a second vessel, volatile organic compound vapors generated during loading of the first vessel;
- transferring the vapors through a fire safe vapor flow control valve on the first vessel;
- transferring the vapors through a detonation arrestor on the first vessel; and
- transferring the vapors on the second vessel through a vapor blower.

3. The method of claim 2 wherein the step of transferring the vapors through a detonation arrestor on the first vessel happens after the step of transferring the vapors through a fire safe vapor flow control valve on the first vessel.

4. The method of claim 2 wherein the step of transferring the vapors through a vapor blower happens after the step of transferring the vapors through a detonation arrestor on the first vessel.

5. The spread on the first vessel of claim 1 further comprising:
- a reel mounted to the first vessel for deploying or retracting the hose.

6. The spread on the first vessel of claim 1 further comprising:
- a hose manifold for connecting the hose to the spread on the first vessel.

7. The spread on the first vessel of claim 1 further comprising:

a chute for supporting a hose.

8. The spread on the first vessel of claim 1 further comprising a vapor destruction device mounted to the first vessel for destroying said hydrocarbon vapors transferred through the hose to the first vessel from the second vessel.

9. The spread on the first vessel of claim 8, wherein the spread comprises two or three or four vapor destruction devices.

10. The spread on the first vessel of claim 8, wherein the vapor destruction device is a combustor.

11. The method of claim 2, further comprising:

enriching, by the introduction of fuel, said vapor on said second vessel prior to destruction of said vapor.

12. The method of claim 11, wherein said fuel is propane or natural gas.

13. The method of claim 2, wherein the loading rate of the first vessel is between 3,000 Barrels Per Hour (BPH) and 200,000 BPH, inclusive.

14. The method of claim 2, wherein the first vessel is selected from the group consisting of an Ultra Large Crude Carrier, an Aframax, a Panamax, a Suezmax, a Very Large Crude Carrier, a shuttle tanker, a barge, and a slot barge.

15. The method of claim 2, wherein the second vessel is selected from the group consisting of an Ultra Large Crude Carrier, an Aframax, a Panamax, a Suezmax, a Very Large Crude Carrier, a shuttle tanker, a barge, and a slot barge.

16. The method of claim 2, further comprising:

loading the first vessel with hydrocarbons from a third vessel.

17. The method of claim 16, wherein the third vessel is selected from the group consisting of an Ultra Large Crude Carrier, an Aframax, an Panamax, an Suezmax, a Very Large Crude Carrier, a shuttle tanker, a barge, a slot barge, a Floating Production Storage Offloading facility, and a Floating Storage Offloading facility.

18. The method of claim 2, further comprising:

destroying said vapors on said second vessel using a spread on the second vessel comprising a combustor.

19. The method of claim 3, further comprising:

destroying said vapors on said second vessel using a spread on the second vessel comprising a combustor.

20. The method of claim 4, further comprising:

destroying said vapors on said second vessel using a spread on the second vessel comprising a combustor.

* * * * *